Oct. 9, 1934.    H. C. HILKE    1,976,020
TRIM SAW
Filed April 26, 1932    3 Sheets-Sheet 1
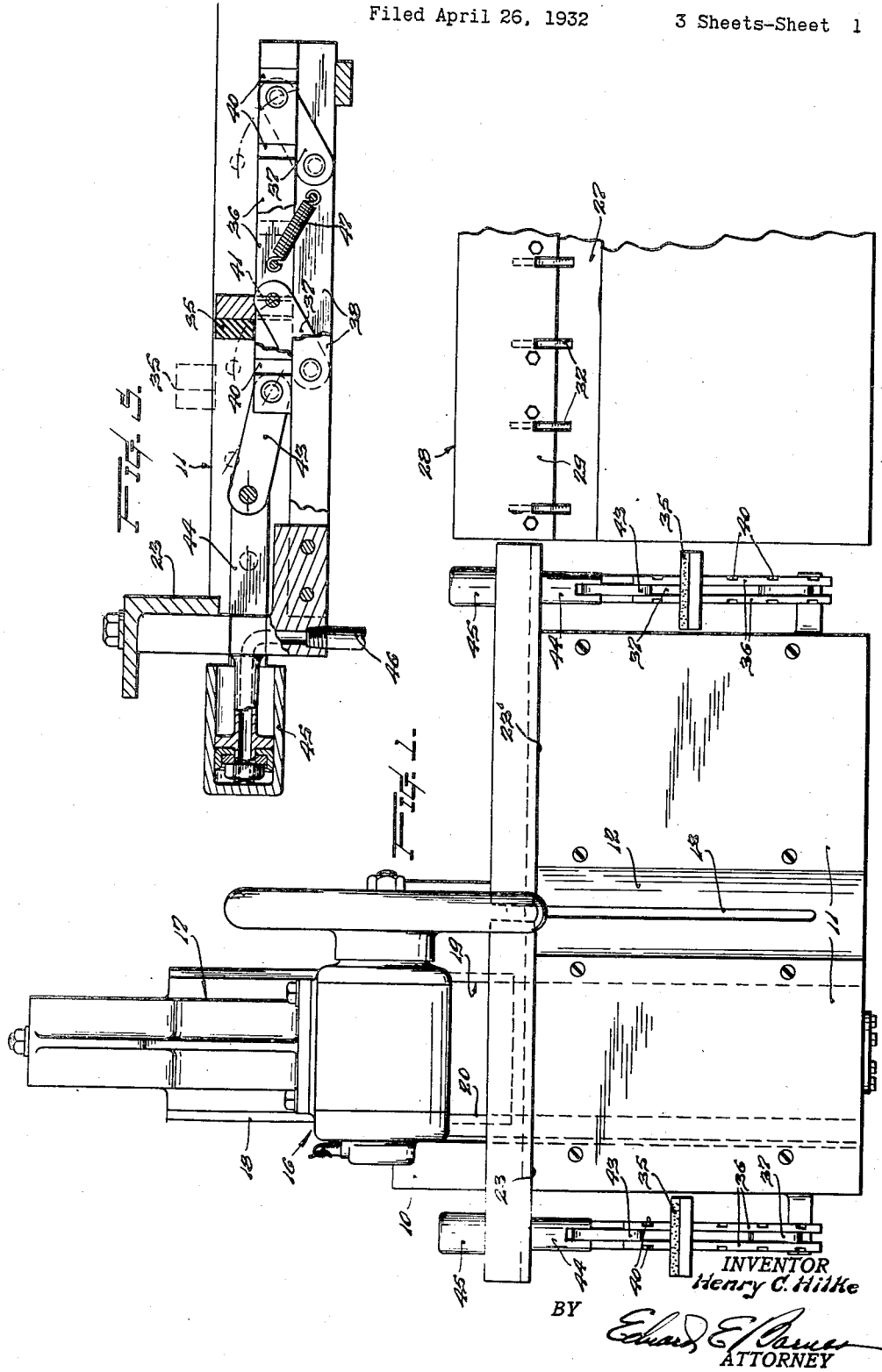
INVENTOR
Henry C. Hilke
BY
ATTORNEY Oct. 9, 1934.  H. C. HILKE  1,976,020
TRIM SAW
Filed April 26, 1932   3 Sheets-Sheet 2
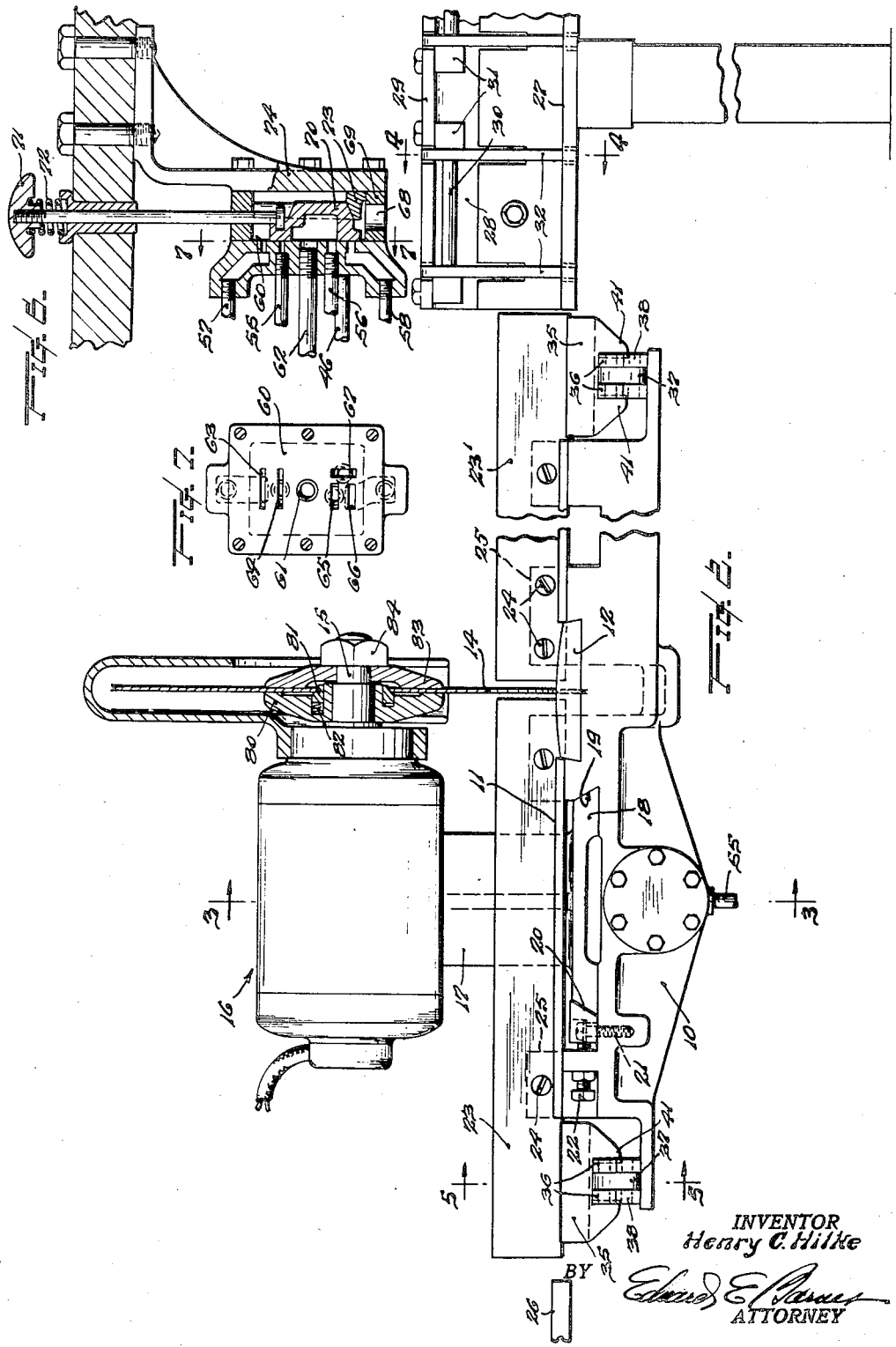
INVENTOR
Henry C. Hilke
BY
ATTORNEY Oct. 9, 1934.  H. C. HILKE  1,976,020
TRIM SAW
Filed April 26, 1932   3 Sheets-Sheet 3
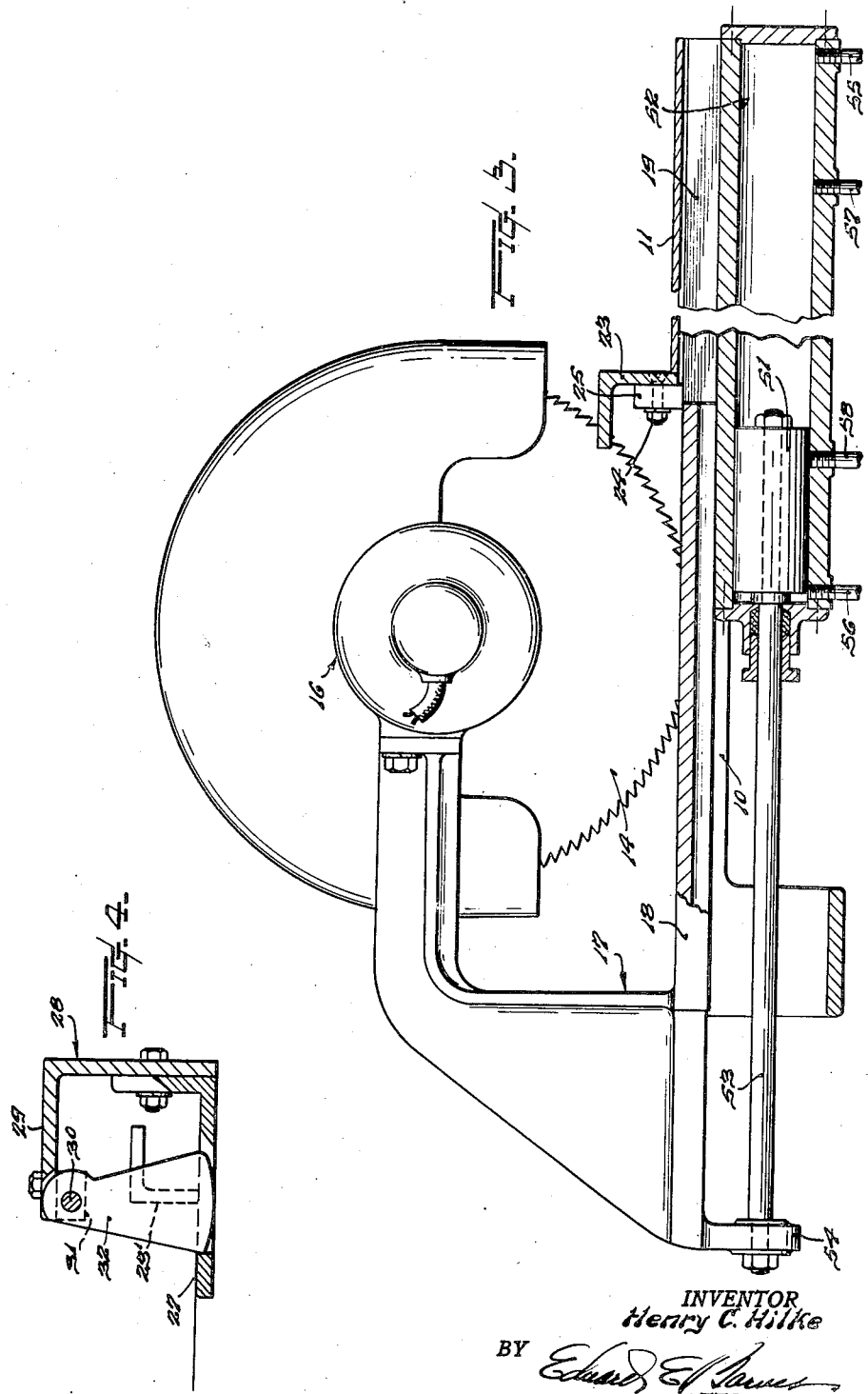

Patented Oct. 9, 1934

1,976,020

UNITED STATES PATENT OFFICE 1,976,020

TRIM SAW

Henry C. Hilke, Seattle, Wash., assignor to Seattle Cedar Lumber Manufacturing Company, Seattle, Wash., a corporation of Washington Application April 26, 1932, Serial No. 607,548

9 Claims. (Cl. 143—168)

This invention relates to trim saws, and has for an object, generally stated, the provision of most efficient yet relatively inexpensive mechanism adapted to effect a true right angle trim to the ends of lumber.

More particularly, it is an object of the present invention to provide mechanism which most effectively handles not only straight but also such lumber as may be slightly curved, in either instance assuring a true end trim.

Further and more particular objects directed to such end will appear in the course of the following detailed description and claims, the invention consisting in the novel construction, adaptation, and combination of parts hereinafter described and claimed.

In the drawings:

Figure 1 is a top plan view of trim saw mechanism constructed in accord with the preferred embodiment of the present invention.

Figure 2 is an enlarged front elevation thereof, parts being broken away and the arbor assembly for the saw represented in vertical section.

Figure 3 is a transverse vertical section taken on line 3—3 of Figure 2, with parts represented in side elevation.

Figures 4 and 5 are transverse vertical sections taken respectively through 4—4 and 5—5 of Figure 2, the latter indicating the work clamping jaws and the former the arrangement of the work guide to the stop fingers.

Figure 6 is a detail vertical section of the foot-operated air valve; and

Figure 7 is a vertical section representing the seat for said valve, said section taken on line 7—7 of Figure 6.

Reference being had to the drawings, the numeral 10 indicates the frame for a work-supporting table 11, a wearing block 12 received medially of the table length being slotted as at 13 to accommodate the passage of a trim saw 14 having its arbor 15 continuously revolved by the rotor of a motor 16. Said motor is supported for reciprocatory transverse motion on a carriage 17 which includes a slide block 18 working in a dove-tail 19 grooved into the frame. As represented in Figure 2, one wall 20 of said dove-tail is laterally adjustable through the medium of clamping cap screws 21 cooperating with set screws 22 in affording a take-up to accommodate slight wear on the slide. Formed of angle iron or the like, guides 23, 23' at opposite sides of said trim saw are secured as by screws 24 to upstanding lugs 25 of the table frame, said guides however, as with the supporting table 11, proper, being of relatively short length.

26 indicates the supply table at one side of the frame 10 while 27 represents the receiving table at the opposite side, said latter table supporting an angle 28 along its rear edge, the upper flange 29 of which is forwardly directed. Pivotally suspended from horizontal pins 30 fulcrumed in bearing boxes 31, said angle supports a plurality of spaced apart stop fingers 32 the front and rear edges of which, as best represented in Figure 4, overlap the saw guide 23'. The operator, in handling the work, draws the front edge past the slot 13, presses the same against the face of guide 23 and operates the saw as will be hereinafter described, the work being subsequently advanced until its following end is opposite the saw after which such work is pressed against the face of guide 23' with the previously trimmed end abutting the forward face of one of the stop fingers 32, the fingers in advance of that contacted swinging inwardly about the axis of their respective pivot pins. As is believed obvious, subsequent trimming to the rear end effects a true right angle trim, such curvature of the board as may exist being accommodated by an admission of the leading end, which may curve inwardly, into the throat of the angle bar 28 which extends rearwardly of the guide 23'.

Reverting more particularly to said guides 23, 23', for cooperative activity therewith in assuring a secure engagement of the work thereto, I provide work-clamping jaws 35 supported over respective pairs of companion spaced-apart bar elements 36, said bar elements connected by parallel links 37 with companion stationary bars 38. As shown, in longitudinally spaced dispositions of the movable bars, the same present a plurality of vertical grooves 40 selectively adapted to receive, in straddling engagement over the bars, forked foot elements 41 provided by the jaws. The forward gripping face of the jaw is or may be of rubber. Said jaws, one at either side of the saw, are arranged to operate in unison, drag links 43 being connected with respective slide elements 44 of movable cylinders 45, said cylinders operated by the controlled admission and exhaust of compressed air introduced and discharged through joined pipes 46 leading to the chamber of a control valve. 47 indicates a return spring.

Said control valve, of the slide type, serving to control said clamping jaws, further acts to effect the reciprocatory motion of the saw to accommodate forward trimming action of the same simultaneously with the work-clamping action of the respective jaws. To such end, said saw being operated by the movement of a double-acting trunk piston 51 working in a cylinder 52, a connecting rod 53 from said piston being secured to a depending lug 54 of the saw carriage, 55, 56 represent inlet pipes located at the opposite extremities of the cylinder with pipes 57, 58 being spaced inwardly therefrom to act as exhaust outlets. As represented in Figure 6, the seat 60 for the valve provides a medially located admission port 61 for a pipe 62 supplying air under pressure, at one side of which port milled slots 63, 64 communicate with the admission and exhaust pipes 55, 57. At the opposite side of said port, milled slots 65, 66 and 67 respectively communicate with the pipes 56, 58, and 46. The latter of said slots 67, as shown, is milled longitudinally to serve both as an admission from the port 61 and as an outlet to the exhaust opening 68 from the chest 69. 70 represents the valve, operated by a foot pedal 71 in opposition to a spring 72. 73 represents the valve balancer and 74 the supporting bracket.

The operation of the valve is believed obvious. In its depressed position shown in Figure 6, compressed air is admitted from the pipe 62 to the slots 65 and 67, the latter serving to introduce air to the cylinders 45 in forcing the same rearwardly to engage the work between the respective jaw and the guide. The exhaust pipe 57 from the cylinder 52 being simultaneously opened responsive to a clearing of the slot 63 by the valve lap, the compressed air entering slot 65 forces the piston 51 forwardly to effect a trimming of the work. A release of the operator's foot from the pedal opens slots 66 and 67 to the atmosphere and the compressed air entering the cleared slot 62 retracts the saw with the springs 47 returning the jaws to their inoperative position. The exhaust openings from the cylinder, in a manner believed evident, are located to effect a cushion to the travel of the piston 51.

Reference being directed to Figure 2 with attention had to the saw arbor assembly shown, the inner collar 80 therefor provides an annular groove serving to receive a conical ring 81, springs 82 being socketed in circumferentially spaced dispositions about the groove in expressing said ring directively of the outer collar 83. A clamping nut is indicated at 84. The arrangement assures a true set of the saw on the arbor, being placed over the conical surface of the ring to effect a collective movement rearwardly as the collar 83 is forced inwardly.

While illustrating and describing the invention in its now preferred form, it is not my intention to in any way confine the same except as may be limited by the scope of the hereto annexed claims.

What I claim is:

1. In trim saw mechanism, a frame having a work-supporting table and a pair of vertical longitudinally-aligned spaced guides along the rear edge of said table, a continuously revoluble circular trim saw, a carriage therefor supporting said saw for travel in a horizontal plane transversely of the table between said guides, work-clamping jaws movable from a normal disposition below the plane of the work-supporting table into clamping engagement to the work on said table for compressing the work to the guides, means for operating said jaws into work-clamping positions and means operable simultaneously therewith for effecting a trimming action of the saw to the end of the clamped work, means for retracting the saw, and means for releasing the jaw from its clamping engagement to the work.

2. In trim saw mechanism, a frame having a work-supporting table and a vertical work guide running longitudinally of the same, a continuously revoluble circular trim saw supported for movement transversely of the table, a work-clamping jaw movable from a normal disposition below the plane of the table into engagement with the work on the table for clamping the work therebetween and the guide, means for operating said jaw into and out of work-clamping position, and means for operating said saw into and out of trimming engagement to the clamped work.

3. In trim saw mechanism, the combination with a trim saw, a work-supporting table, and a guide for locating the work to trim an end of the same, of clamping mechanism for pressing the work against the guide, said mechanism comprising a bar movable in a transverse plane, parallel links pivotally connected to said bar for movement about respective stationary axes, a jaw element detachably connected to said bar and adjustable longitudinally of the same, and means for operating said bar about said link pivots.

4. The combination with a work-supporting table having a vertical rear wall, of work-clamping means movable from a normal disposition below the plane of the table into engagement with the work thereon for clamping the same between said jaw and the rear wall, and means for operating said jaw.

5. In lumber trimming mechanism, a frame having a table for supporting the lumber, a pair of vertical longitudinally aligned and relatively short spaced guides along the rear edge of the table, a circular trim saw adapted for movement transversely of the table between said guides, a bench extending longitudinally from one end of the table and horizontally aligned therewith for supporting the leading end of the lumber, a plurality of spaced stop fingers for gauging the length of the lumber pivotally supported by said bench and swingable under the influence of lumber being advanced over the bench rearwardly beyond the longitudinal vertical plane of the work guides, work-clamping jaws operable to successively clamp the leading and following end portions of the lumber being trimmed against the guides for positioning the lumber to effect a right-angle trim to the leading and following ends of the same, said movement of the stop fingers rearwardly beyond the longitudinal vertical plane of the guides under the influence of the lumber allowing freedom of movement of the leading end of bowed lumber to obtain a true seating engagement of the rear end portion against the guide, and means for operating said jaws into and from work-clamping positions.

6. In mechanism for effecting a right-angle trim to the ends of lumber, a table, a circular trim saw supported for movement transversely of said table, a relatively short vertical guide located along the rear edge of the table and extending longitudinally thereof at right angles to the line of saw movement, said guide acting to position the lumber to obtain a true right-angle trim to the rear end of the same by affording a seat for that portion only of the edge of the lumber which is in close proximity to the end being cut, and a plurality of stop fingers spaced one from the other and from the guide for selectively receiving the leading end of the lumber thereagainst for gauging the length of the lumber, said stop fingers being normally located in but swingable rearwardly beyond the longitudinal vertical plane of the guide under the influence of the inner side of lumber being advanced to allow free movement of the leading ends of bowed lumber laterally beyond the longitudinal vertical plane of the guide, said free movement of the leading ends of bowed lumber accommodating a true seating of said rearmost edge of the lumber against the guide.

7. In mechanism for trimming the ends of lumber, a table for supporting the lumber, a circular trim saw supported for movement transversely of the table, a relatively short vertical guide located in proximity of the line of saw movement and extending longitudinally of the table at a predetermined fixed angle as regards the line of saw movement, and a plurality of stop fingers spaced from the guide and one from another and normally lying in the path of movement of the leading end of lumber being advanced longitudinally of the table for selectively receiving the leading end of the lumber to gauge the length of the same, said stop fingers being swingable independently out of the path of travel of the lumber being advanced over the table to accommodate unrestricted movement of the leading end of bowed lumber laterally beyond the longitudinal vertical plane of the guide, said unrestricted movement of the leading end of bowed lumber affording, in conjunction with the limited length of the guide, a seating engagement against the guide of a relatively short portion only of the end of the lumber in proximity of the line of saw movement.

8. The combination with a work-supporting table, of clamping mechanism providing a pair of jaws operative to clamp the work therebetween, one of said jaws comprising a member movable from a disposition below the plane of the table into clamping engagement to the work on the table, and means for operating said last-named jaw.

9. In mechanism for trimming the ends of lumber, the combination with a table for supporting the lumber, and a saw arranged for trimming engagement with respect to the ends of lumber supported by said table, of a relatively short vertical guide located in proximity of the saw and extending longitudinally of the table at a predetermined fixed angle as regards the cutting plane of the saw, and means spaced from the guide and lying in the path of movement of the leading end of lumber being advanced longitudinally of the table for gauging the length of the lumber, said spaced length-gauging means being arranged to allow unrestricted movement of the leading end of bowed lumber laterally beyond the longitudinal vertical plane of the guide and acting, in conjunction with the limited length of the guide, to afford a seating engagement against the guide of a relatively short portion only of the end of the lumber in proximity of the cutting plane of the saw.

HENRY C. HILKE.